(12) United States Patent
Steeves et al.

(10) Patent No.: US 8,667,581 B2
(45) Date of Patent: Mar. 4, 2014

(54) RESOURCE INDICATOR TRAP DOORS FOR DETECTING AND STOPPING MALWARE PROPAGATION

(75) Inventors: David J. Steeves, Seattle, WA (US); Gregory D. Hartrell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1564 days.

(21) Appl. No.: 11/422,937

(22) Filed: Jun. 8, 2006

(65) Prior Publication Data
US 2007/0289018 A1 Dec. 13, 2007

(51) Int. Cl.
*G06F 11/00* (2006.01)

(52) U.S. Cl.
USPC .......................................................... 726/22

(58) Field of Classification Search
USPC .............. 726/22–25; 709/223, 224, 225, 229; 714/100, 4; 713/188
See application file for complete search history.

(56) References Cited

U.S. PATENT DOCUMENTS

| | | | | |
|---|---|---|---|---|
| 6,026,440 A * | 2/2000 | Shrader et al. | ................ | 709/224 |
| 6,088,804 A * | 7/2000 | Hill et al. | ........................ | 726/25 |
| 7,299,367 B2 * | 11/2007 | Hamm et al. | ................. | 713/194 |
| 7,313,691 B2 * | 12/2007 | Bantz et al. | .................... | 713/155 |
| 7,424,735 B2 * | 9/2008 | Sorkin et al. | ....................... | 726/4 |
| 7,502,797 B2 * | 3/2009 | Schran et al. | ................... | 707/10 |
| 7,526,809 B2 * | 4/2009 | Liang et al. | ..................... | 726/24 |
| 7,634,808 B1 * | 12/2009 | Szor et al. | ....................... | 726/22 |
| 7,650,382 B1 * | 1/2010 | Sobel et al. | .................... | 709/206 |
| 7,657,735 B2 * | 2/2010 | Amoroso et al. | ............. | 713/150 |
| 7,725,937 B1 * | 5/2010 | Levy | ................................. | 726/23 |
| 7,926,104 B1 * | 4/2011 | Sundaram et al. | .............. | 726/22 |
| 7,950,060 B1 * | 5/2011 | Kennedy et al. | ................ | 726/24 |
| 2002/0078382 A1 * | 6/2002 | Sheikh et al. | ................. | 713/201 |
| 2003/0023875 A1 * | 1/2003 | Hursey et al. | ................. | 713/201 |
| 2004/0111632 A1 * | 6/2004 | Halperin | ........................ | 713/200 |
| 2004/0243843 A1 * | 12/2004 | Kadobayashi et al. | ....... | 713/201 |
| 2006/0021035 A1 * | 1/2006 | Conti et al. | ...................... | 726/22 |
| 2006/0037075 A1 * | 2/2006 | Frattura et al. | .................. | 726/22 |
| 2006/0101515 A1 * | 5/2006 | Amoroso et al. | .............. | 726/23 |
| 2006/0137012 A1 * | 6/2006 | Aaron | .............................. | 726/24 |
| 2006/0161982 A1 * | 7/2006 | Chari et al. | ..................... | 726/23 |
| 2007/0016951 A1 * | 1/2007 | Piccard et al. | .................. | 726/24 |
| 2007/0022213 A1 * | 1/2007 | Fahmy et al. | ................. | 709/246 |
| 2007/0101430 A1 * | 5/2007 | Raikar | ............................. | 726/24 |
| 2007/0107053 A1 * | 5/2007 | Shraim et al. | ................... | 726/22 |
| 2007/0240215 A1 * | 10/2007 | Flores et al. | .................... | 726/24 |
| 2007/0261112 A1 * | 11/2007 | Todd et al. | ....................... | 726/11 |

FOREIGN PATENT DOCUMENTS

GB 2364142 * 5/2000 ................ G06F 1/00

* cited by examiner

*Primary Examiner* — Nirav B Patel
(74) *Attorney, Agent, or Firm* — Tony Azure; Andrew Sanders; Micky Minhas

(57) ABSTRACT

A method and system for detecting and stopping malware propagation using false resource entries is provided. A detection system uses trap door entries that are intentionally inserted into resource location stores to detect resource misuse. A "trap door" is a false resource that can be monitored by the detection system. The detection system monitors trapdoor entries that have been intentionally inserted into resource location stores, and looks for signs of use. The detection system can then determine whether a detected use of a trap door entry is a misuse of the trap door entry, and upon declaring a misuse of the trap door entry, the detection system can appropriately respond to the misuse.

16 Claims, 4 Drawing Sheets

RESOURCE INDICATOR TRAP DOORS FOR DETECTING AND STOPPING MALWARE PROPAGATION

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to infect the computer system with software that is designed specifically to damage or disrupt the computer system. Such software is referred to as "malware" because of its malicious nature. When malware invades a computer system, the integrity of the computer system is greatly compromised. Malware includes computer worms, viruses, Trojan horses, spyware, and so forth. Some malware behave nefariously, such as by illicitly collecting and transmitting personal information. Some malware can hijack resources needed by operating system components or use these resources to subvert the security of the operating system. For example, such malware can cause an unprotected network resource to open a TCP/IP port that allows a third party to access the operating system's resources.

One common type of malware acquires computer systems—i.e., targets—in order to propagate itself using the acquired computer systems. For example, the malware could be a worm that launches a self-propagating attack that exploits a vulnerability of a computer system by taking control and using that computer system to find other computer systems with the same vulnerability and launch attacks (i.e., sending the same worm) against them. One such worm is an Internet-scanning worm that generates and scans IP addresses in order to find vulnerable victims.

Various techniques have been developed and used to help detect the presence of such malware; unfortunately, detection of some malware has proved to be difficult. One technique attempts to set a trap, or "honeypot," to detect the unauthorized use of network resources. For example, unused IP address space, such as a subnet, on the Internet can be set up as one or more honeypots in order to detect Internet worm activity. The computer systems that are set up as the honeypots at these addresses will not be providing any real services other than to record the activities of the invader. These honeypots are designed to wait for and detect unauthorized use of the IP addresses. The theory behind creating honeypots is that a worm that is scanning IP addresses is going to stumble across the honeypot and become detected. However, the effectiveness of such honeypots and similar detection technologies depends, in large part, on the worm blindly attempting to connect to multiple IP addresses. As the creators of these worms become more sophisticated in their methods of acquiring targets, these honeypots are becoming increasingly less successful at detecting these sophisticated worms.

SUMMARY

A method and system for detecting and stopping malware propagation using false resource entries is provided. A detection system uses trap door entries that are intentionally inserted into resource location stores to detect resource misuse. A "trap door" is a false resource that can be monitored by the detection system. The detection system monitors trapdoor entries that have been intentionally inserted into resource location stores, and looks for signs of use. The detection system can then determine whether a detected use of a trap door entry is a misuse of the trap door entry, and upon declaring a misuse of the trap door entry, the detection system can appropriately respond to the misuse. For example, malware that attempts to leverage a topology to find its targets by enumerating a resource location store that has been "salted" or injected with a trap door entry will unknowingly use the trap door entry. When the malware uses the trap door entry, the detection system will be able to detect the malware that unknowingly contacts the false resource associated with the trap door entry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
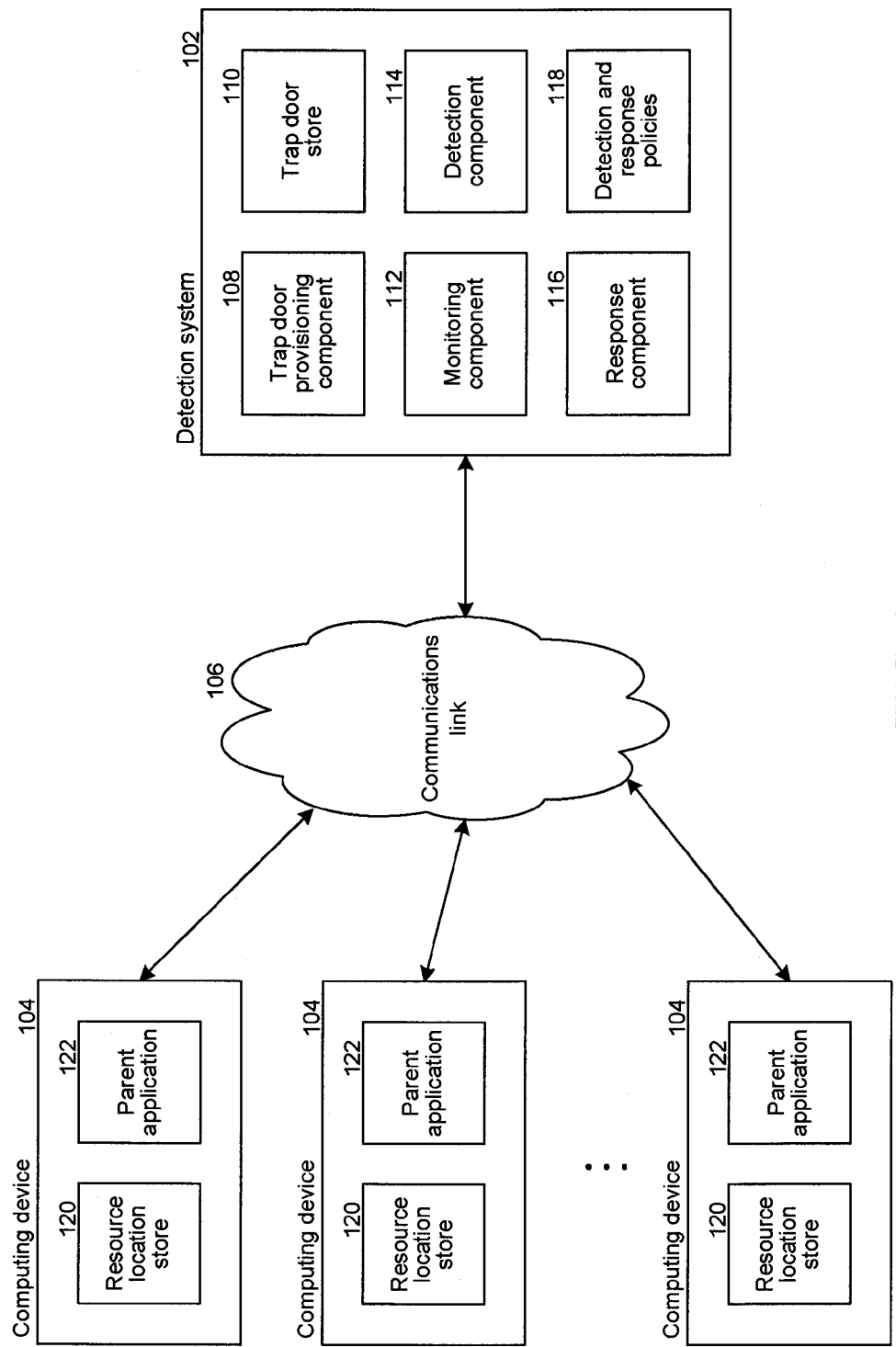
FIG. 1 is a high-level block diagram that illustrates an environment in which a detection system executes, according to some embodiments.

A method and system for detecting and stopping malware propagation using false resource entries is provided. In some embodiments, a detection system uses trap door entries that are intentionally inserted into resource location stores to detect resource misuse. A "trap door" is a false resource that can be monitored by the detection system. A trap door may point to (e.g., symbolically linked to) the detection system or may be known by the detection system. "Resource location stores" are data structures that maintain mappings from one or many logical entities to one or many other entities. The mappings are usually in pairs, and it is typical for one of the entities in the pair to be considered a "friendly" named version of the other, such as, by way of example, a Domain Name Service (DNS) name to IP address, etc. Examples of resource location stores include email contact lists, IM contact lists, web browsing caches/histories/bookmarks, local host lookup files, routing tables, Really Simple Syndication (RSS) feeds, and the like. Trap door entries are intentionally inserted into resource location stores. For example, a system, such as the detection system, can enumerate known resource location stores, insert trap door entries in some or all of the resource location stores, and register the trap door entries with the detection system. In another example, a parent application of a resource location store can request a trap door entry from the detection system. The detection system can then assign a trap door entry for the parent application and provide to the parent application the assigned trap door entry. The parent application can then insert the trap door entry into the resource location store as appropriate. In still another example, the parent application can create a trap door entry, insert the trap door entry into the resource location store, and register the trap door entry with the detection system. A "parent application" is an application that utilizes a particular resource location store. A parent application may execute on either server computing devices or client computing devices. For example, an email server or an email client may be a parent application of an email contact list, an IM server or an IM client may be a parent application of an IM contact list, an operating system (OS) networking stack may be a parent application of a hostname lookup file, etc. To detect malware, the detection system monitors trapdoor entries that have been inserted into resource location stores for use. The detection system can then determine whether a detected use of a trap door entry is a misuse of the trap door entry, and upon declaring a misuse of the trap door entry, the detection system can appropriately respond to the misuse. For example, malware that attempts to leverage a topology to find its targets by enumerating a resource location store that has been "salted" or injected with a trap door entry will unknowingly use the trap door entry. When the malware uses the trap door entry, the detection system will be able to detect the malware that unknowingly contacts the false resource associated with the trap door entry. For example, when malware enumerates an email contact list salted with a trap door entry in its attempt to find legitimate email addresses, the malware will use the trap door entry to forward an email message (or its attack) to the detection system, thus allowing the detection system to detect the malware.

In some embodiments, the detection system declares a misuse of a trap door entry upon detecting a single use of the trap door entry. In some embodiments, the detection system applies a threshold before declaring a misuse of a trap door entry. For example, the detection system may wait until it detects a threshold number of uses of a trap door entry before declaring a misuse of the trap door entry. The threshold may vary depending on the type of resource location store and/or trap door entry, and may be specified by an administrator of the detection system. By applying a threshold before declaring a misuse, the detection system allows for the possibility of a legitimate, but accidental, use of the trap door entry, for example, by the parent application of the resource location store. In some embodiments, the detection system may apply a dynamic threshold, using a moving weighted average or other statistical methods, before declaring a misuse of a trap door entry. For example, between 6 AM to 6 PM each day, the detection system may wait until it detects n uses of a trap door entry in an m minute time period before declaring a misuse of the trap door entry, and during the other times of the day the detection system may wait until it detects x uses of a trap door entry in a y minute time period before declaring a misuse of the trap door entry. As another example, the detection system may wait until it detects n uses of a trap door entry by a first group of machines before declaring a misuse of the trap door entry, and m uses of a trap door entry by a second group of machines before declaring a misuse of the trap door entry. The threshold value may vary across factors, such as, by way of example, time, groups of machines, groups of applications, etc.

In some embodiments, the detection system, upon detecting a misuse of a trap door entry, responds by providing an alert. For example, the detection system can send an alert, such as, by way of example, an email message, a pager message, an IM message, etc., to indicate the detection of the misuse of the trap door entry. The alert may be sent to the detection system administrator, a third-party component, or to the parent application of the resource location store that contained the misused trap door entry.

In some embodiments, the detection system can respond to the misuse of a trap door entry by requiring human interaction, such as human interactive proof, before allowing further actions involving the resource location store that contained the misused trap door entry. For example, the detection system can instruct the parent application of the resource location store to verify that a human user is at the computing device on which the misused trap door entry is located. In response, the parent application can display a question or a human interactive proof on the computing device and ask the human user to input to the displayed question or respond to the human interactive proof.

In some embodiments, the detection system can respond to the misuse of a trap door entry by terminating the execution of the parent application executing on the computing device on which the misused trap door entry is located. For example, the detection system may have detected misuse of an email trap door entry located on a particular computing device. In response, the detection system can initiate the termination of the email client application that is executing on that particular computing device. In some embodiments, the detection system can respond to the misuse of a trap door entry by requiring re-authentication of the parent application executing on the computing device on which the misused trap door entry is located. For example, the detection system may have detected misuse of an IM trap door entry located on a particular computing device. In response, the detection system can cause the IM client application that is executing on that particular computing device to perform a re-authentication of its user. The IM client application on that particular computing device can perform a logout process and request that its user re-authenticate with the IM client application.

In some embodiments, the detection system can respond to the misuse of a trap door entry by rate-limiting the actions involving the resource location store associated with the misused trap door. Rate-limiting is usually a function of a specified number of resource uses per time period. For example, upon detecting the misuse of an email trap door entry, the detection system can instruct the email server to rate-limit the sending of email messages to, for example, one per ten minute time period, or other predetermined rate, thus hindering or otherwise thwarting the propagation of the malware to other would be victims (i.e., targets). In another example, upon detecting the misuse of a trap door entry in a routing table, the detection system can instruct the OS on the computing device on which the misused trap door entry is located to rate-limit the use of the protocol stack on the particular computing device.

In some embodiments, the detection system can compare information associated with detected misuses of trap door entries to identify common properties, patterns, etc., to the detected misuses. The detection system can then provide a more informative alert that includes information regarding the identified commonalities. For example, the detection system may determine that misuses of IM trap door entries are occurring in a particular domain group. The detection system can then alert the IM server or servers of the trap door misuses which were detected in the particular domain, and the IM servers can "shut-off" the IM traffic in the particular domain. In this instance, IM users in the particular domain who may not have misused the trap door entry will also be shut of from using the IM services due to the potentially growing malware propagation within the particular domain. In another example, the detection system may determine that detected misuses of email trap door entries involved the sending of a sufficient number of common test string. The detection system can send an alert to the email servers that identifies the common text string as a malware signature (e.g., a signature for a worm), thus enabling the email servers to undertake appropriate action to counteract the attack.

In some embodiments, the detection system can intelligently respond on behalf of the fake resource. Suspicious malware may first attempt to verify that an entry in a resource location store is a valid entry before using the entry to propagate itself or its action. To verify the entry as valid, the malware may use the entry to send a request and wait for a valid response. By sending an intelligent response to a detected use of the trap door entry, the detection system is able to allay the suspicions of the malware. For example, upon detecting the use of an email trap door entry, the detection system can send an Out-Of-Office reply or other suitable message. As another example, upon detecting the use of an IM door entry, the detection system can send an intelligent response, such as, by way of example, "I'm not available to IM now." The intelligent responses may also be at the application protocol (programmatic) level. For example, the malware may cause the sending of a request to establish a connection at a communication protocol level (e.g., a session connect request), and wait for a valid response. In this instance, the detection system can send an appropriate programmatic response to establish the requested connection (e.g., a session connect response) to allay the suspicions of the malware.

FIG. 1 is a high-level block diagram that illustrates an environment in which a detection system executes, according to some embodiments. As depicted, a detection system 102 is coupled to a plurality of computing devices 104 via a communications link 106. The computing device comprises a resource location store 120 and, optionally, a parent application 122. The resource location store maintains logical mappings to live hosts and, as such, contain information which can be used by malware to harvest its targets. The resource location stores contain the trap doors or fake resource entries. The parent application, when present, is an application that utilizes its corresponding resource location store. Although each computing device is depicted as containing a single resource location store, a computing device may include multiple resource location stores. The detection system comprises a trap door provisioning component 108, a trap door store 110, a monitoring component 112, a detection component 114, a response component 116, and a detection and response policies 118. The trap door provisioning component facilitates the setup of a trap door entry in a resource location store. The trap door store contains the trap doors that have been created and inserted into the resource location stores. The monitoring component monitors the trap door entries that have been inserted into the resource location stores for use. Upon detecting the use of a trap door entry, the monitoring component invokes the detection component to determine if the detected use of the trap door entry is a misuse of the trap door entry. The detection component uses the policies specified in the detection and response policies to determine if the detected use of the trap door entry is or amounts to a misuse of the trap door entry. The monitoring component also invokes the response component to respond to the detected use of the trap door entry. The response component responds to the detected use of the trap door entry according to the policies specified in the detection and response policies. The detection and response policies contain the information (e.g., rules) for declaring a misuse of the trap door entries, and responding to the detected use of trap door entries. For example, a rule in the detection and response policies may indicate that five uses of an email trap door entry in a specified domain needs to be detected before declaring a misuse of the particular email trap door entry. Another rule in the detection and response policies may indicate that a particular type of alert should be issued when a misuse of an IM trap door entry is detected. Still another rule may specify the rate-limiting parameters. The detection system may be implemented as a component of one or more servers, such as email servers, IM servers, communication servers, etc., or as a stand-alone server that provides its services to one or more other servers.

The computing device on which the detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the detection system may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
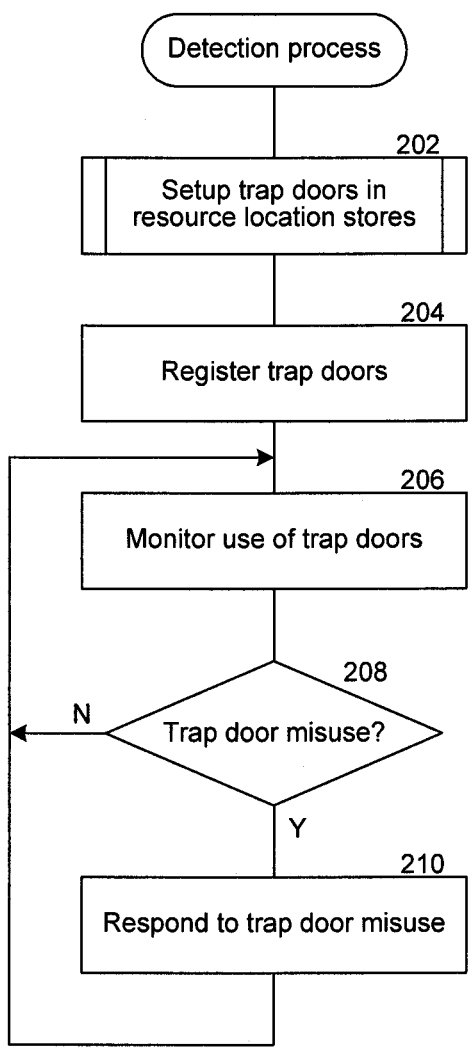
FIG. 2 is a flow diagram that illustrates the processing of the detection system to detect trap door misuse, according to some embodiments.

FIG. 2 is a flow diagram that illustrates the processing of the detection system to detect trap door misuse, according to some embodiments. The detection system monitors trap door entries which have been intentionally introduced in one or more resource location stores for signs of misuse, and automatically responds to detected misuses of the monitored trap door entries. In block 202, the trap doors are setup in the resource location stores. A trap door is setup in a resource location store by inserting a fake or false entry (i.e., a trap door entry) into the resource location store. In block 204, the trap door entries that are inserted into the resource location stores are registered with the detection system. In block 206, the detection system monitors the use of the trap door entries in the resource location stores. When the use of a trap door entry is detected, the detection system, in block 208, checks to determine if the detected use of the trap door entry is a misuse of the trap door entry. If the use of the trap door entry is not a misuse, then the detection system continues monitoring the use of trap door entries in block 206. In some embodiments, the detection system may respond to the detected use of the trap door entry. For example, the detection system may record the detected use in a log file. The detection system may also respond by sending an intelligent reply to the user of the trap door entry. Otherwise, if the detection system determined that the detected use of the trap door is a misuse of the trap door, then, in block 210, the detection system responds to the misuse of the trap door. For example, upon detecting a misuse of a trap door entry, the detection system can respond by providing an alert to a third-party component or back to the parent application with recommended actions. The type of alert, who to send the alert to, the recommended action, etc., may be specified in the detection and response policies. Upon responding to the trap door misuse, the detection system continues monitoring the use of trap door entries in block 206.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 3:
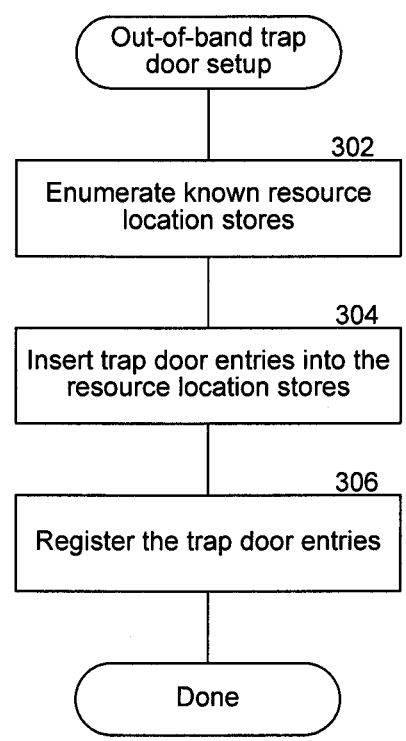
FIG. 3 is a flow diagram that illustrates an out-of-band trap door setup process, according to some embodiments.

FIG. 3 is a flow diagram that illustrates an out-of-band trap door setup process, according to some embodiments. An out-of-band trap door setup does not involve the parent application of the resource location store into which the trap door is setup. In block 302, the detection system identifies the known resource locations stores. For example, code can be run on each system to enumerate the known resource location stores on the system. In block 304, the detection system can insert trap door entries into the identified resource location stores. In some embodiments, the detection system can insert a trap door entry into each resource location store. In other embodiments, the detection system can insert a trap door entry into some of the identified resource location stores. For example, the detection system may insert a trap door into a subset of the resource location stores in a particular subnet. In block 306, the detection system registers the trap door entries that have been inserted into the resource location stores. For example, the detection system may register the trap door entry by specifying the policies and rules for the trap door entry in the detection and response policies. Registering a trap door entry allows the trap door entry to become known to the detection system, and allows the detection system to start monitoring the use of the trap door entry.

Figure 4:
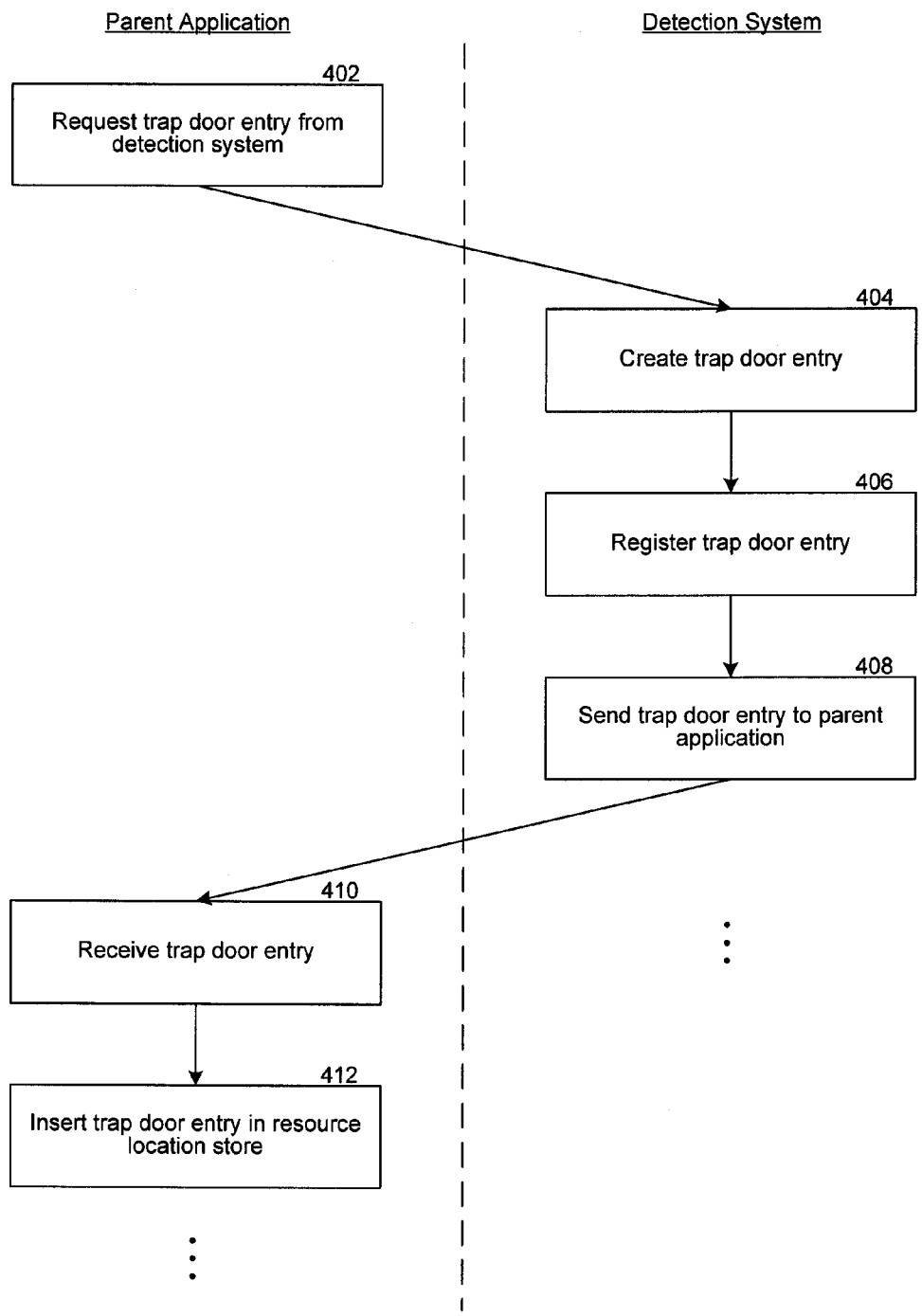
FIG. 4 is a flow diagram that illustrates an in-band trap door setup process, according to some embodiments.

FIG. 4 is a flow diagram that illustrates an in-band trap door setup process, according to some embodiments. An in-band trap door setup does involve the parent application of the resource location store into which the trap door is setup. In block 402, the parent application requests a trap door entry from the detection system. In response, in block 404, the detection system creates a trap door entry that is appropriate for the parent application and its corresponding resource location store. In block 406, the detection system registers the created trap door entry. In block 408, the detection system sends the registered trap door entry to the requesting parent application. In block 410, the parent application receives from the detection system the trap door entry. In block 412, the parent application inserts the trap door entry in the resource location store.

From the foregoing, it will be appreciated that specific embodiments of the detection system have been described herein for purposes of illustration, but that various modifications may be made without deviating from the spirit and scope of the invention. For example, one skilled in the art will appreciate that a system other than the detection system may setup the trap doors in the resource location stores, and subsequently register the trap door (e.g., trap door entries inserted into the resource location stores) with the detection system. Although the misuse of the trap door entries have been described in the context of malware, one skilled in the art will appreciate that the misuse of the trap door entries is not limited to only malware. For example, the misuse of the malware may be done manually by a person with malicious intent. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for detecting malware propagation in a resource location store by a detection system, the resource location store being a data structure that contains, for each of a plurality of names, an entry that maps that name to an address associated with that name, the method comprising:

generating, by a parent application which utilizes the resource location store, a request for a false entry from the detection system for insertion into the resource location store to detect malware propagation;

sending to the detection system the generated request;

receiving from the detection system the false entry, the false entry mapping a false name to an address associated with the detection system; and inserting the received false entry into the resource location store to detect malware propagation wherein the detection system receives a malware request sent by malware to the address of the false entry; and after receiving the malware request, sends a valid response to the malware request; the valid response sent to prevent the malware from considering the address of the false entry to be a trap door;

determines whether the malware request sent to the address of the false entry is a misuse of the false entry according to a predetermined policy of misuse; and after determining that the malware request is a misuse of the false entry, requires human interaction before further use of the resource location store containing the misused false entry is allowed.

2. The method of claim 1, wherein the resource location store includes an email contact list.

3. The method of claim 1, wherein the resource location store includes an instant messaging contact list.

4. The method of claim 1, wherein the resource location store includes a web browsing cache.

5. The method of claim 1, wherein the resource location store includes a routing table or a host lookup file.

6. The method of claim 1, wherein, the false entry is inserted into to the resource location store by the parent application.

7. The method of claim 1, wherein the false entry is inserted into the resource location store by the detection system.

8. The method of claim 1, wherein the detection system determines a misuse of the false entry upon detecting a single use of the false entry.

9. The method of claim 1, wherein the detection system determines a misuse of the false entry upon detecting a predetermined threshold number of uses.

10. The method of claim 1, wherein the detection system, after determining that the malware request is a misuse of the false entry, raises an alert with recommended actions.

11. A computer-readable storage device having stored therein instructions which when executed cause a processor to perform a method for detecting misuse of a false resource entry, the method comprising:

detecting malware propagation by monitoring use of the false resource entry inserted into a resource location store on a computing device, the false resource entry being inserted into a data structure of the resource location store, the resource location store containing, for each of a plurality of first logical entities, an entry that maps that first logical entity to a second logical entity associated with the first logical entity; and upon detecting use of the false resource entry in the resource location store, providing a valid response to the detected use, the valid response provided to prevent the malware from considering the false resource entry to be a trap door;

determining whether the detected use is a misuse of the false resource entry in accordance with a predetermined policy; and upon determining that the detected use is a misuse of the false resource entry, responding to the misuse of the false resource entry by requiring human interaction on the computing device before allowing further use of the resource location store containing the misused false resource entry.

12. The computer-readable storage device of claim 11, wherein responding to the misuse of the false resource entry includes requesting re-authentication of a parent application of the resource location store containing the misused false resource entry.

13. The computer-readable storage device of claim 11, wherein responding to the misuse of the false resource entry includes terminating execution of a parent application of the resource location store containing the misused false resource entry.

14. The computer-readable storage device of claim 11, wherein responding to the misuse of the false resource entry includes rate-limiting actions involving the resource location store associated the misused false resource entry.

15. The computer-readable storage device of claim 11 further comprising identifying similarities in misuses of false resource entries.

16. A system for detecting malware, the system, comprising:

a memory storing computer-executable instructions of:

a trap door provisioning component that provides false entries for inclusion in resource location stores for malware propagation detection so that the false entries are included in the resource location stores to support detecting malware propagation based on the use of the false entries;

a monitoring component that monitors use of false entries in the resource location stores to detect use;

a detection component that detects misuse of false entries included in the resource location stores in accordance with a predetermined policy specifying when a use of a false entry is a misuse of that false entry; and a response component that responds to detected misuse of trap door entries included in the resource location stores by providing a valid response to the detected misuse, the valid response being provided to prevent the malware from considering a false entry to be a trap door; and requiring human interaction on a computing device storing the resource location store containing the misused false entry before allowing further use of that resource location store; and a processor for executing the computer-executable instructions stored in the memory.

* * * * *